(12) United States Patent
Cornet et al.

(10) Patent No.: US 8,881,870 B2
(45) Date of Patent: Nov. 11, 2014

(54) RECIRCULATION VALVE IN AN AIRCRAFT ENGINE

(75) Inventors: Albert Cornet, Verviers (BE); Nicolas Raimarckers, Tourinne (BE); Bernard Simeon, Libramont (BE)

(73) Assignee: Techspace Aero S.A., Milmort (BE)

( * ) Notice: Subject to any disclaimer, the term of this patent is extended or adjusted under 35 U.S.C. 154(b) by 1269 days.

(21) Appl. No.: 12/335,011

(22) Filed: Dec. 15, 2008

(65) Prior Publication Data
US 2009/0159139 A1   Jun. 25, 2009

(30) Foreign Application Priority Data
Dec. 21, 2007 (EP) .................................... 07447068

(51) Int. Cl.
*F01D 25/18* (2006.01)
*F01D 25/20* (2006.01)

(52) U.S. Cl.
CPC .............. *F01D 25/20* (2013.01); *Y02T 50/671* (2013.01)
USPC ...................................... 184/6.11

(58) Field of Classification Search
CPC ....... F01D 25/20; F01D 25/186; F16N 13/00; F16N 7/32
USPC ........................ 184/6.11; 60/39.08
See application file for complete search history.

(56) References Cited

U.S. PATENT DOCUMENTS

| 3,626,693 | A | | 12/1971 | Guillot |
| 3,626,977 | A | * | 12/1971 | Riley et al. ............. 137/516.25 |
| 4,629,033 | A | * | 12/1986 | Moore et al. .................. 184/6.3 |
| 4,899,850 | A | * | 2/1990 | Koller et al. .................. 184/6.3 |

FOREIGN PATENT DOCUMENTS

| DE | 102004056295 A1 | 6/2006 |
| EP | 1 389 671 A2 | 2/2004 |
| JP | 57070907 A | 5/1982 |
| JP | 62101808 A | 5/1987 |

\* cited by examiner

*Primary Examiner* — Henry Liu
(74) *Attorney, Agent, or Firm* — Reinhart Boerner Van Deuren P.C.

(57) ABSTRACT

The present invention relates to an installation for lubricating and/or cooling in an aircraft engine comprising an oil tank (3), a main feed pipe (6) feeding a main pump (1) supplying a flow in a discharge line from the main pump (7) to one or several systems (2) to be lubricated and/or cooled, wherein the installation comprises a feed pipe for an auxiliary pump (8) fitted in parallel onto the main pipe (6) and connected to an auxiliary feed pump (1A), the latter supplying a flow in a discharge line from the auxiliary pump (8A) connected by a three-way circuit on the one hand to a non-return valve (4A) directed towards the main discharge line (7), and on the other hand to a hydraulically-operated (9) recirculation valve (5), in order to divert the flow from the auxiliary feed pump (1A) into a return line (8B) directly towards the tank (3).

11 Claims, 3 Drawing Sheets

RECIRCULATION VALVE IN AN AIRCRAFT ENGINE

CROSS-REFERENCE TO RELATED PATENT APPLICATIONS

This patent application claims the benefit of European Application No. 07447068.3, filed Dec.21, 2007, the entire teachings and disclosure of which are incorporated herein by reference thereto.

FIELD OF THE INVENTION

The present invention relates to a recirculation valve in an aircraft engine with a lubrication and/or cooling system, some elements of which have a relatively constant need for oil throughout the flight.

STATE OF THE ART

The new generations of aircraft engines tend to provide a solution that consumes less and less fuel. The success with this aim involves incorporating systems that generate more and more heat ("calories") due to:
  the ever greater loads on bearing chambers;
  the incorporation of high-power reduction gearboxes (turbo-props, "open rotors", etc.);
  the incorporation of new equipment (high-power "starter-generators", etc.).

These calories must therefore be absorbed by the oil, which is not only a lubrication fluid but also a coolant. The need for oil is therefore necessarily increased. The needs of the new equipment such as starter-generators (S/Gs) do not meet the traditional requirements as they need almost constant cooling by oil throughout the whole flight phase.

It is known that aircraft engines are lubricated and/or cooled by a collection of pumps. Some of these, the feed pumps, ensure the pressurisation of the oil taken from the tank, which is then fed to the parts of the engine and equipment to be lubricated and/or cooled. In general, these pumps are either driven by a same shaft in a "lubrication group" (LG) or individually spread around the engine.

In fact, with the (traditional) mechanical operation of the lubrication group (LG) mounted on the accessory gearbox (AGB), the flow rates supplied depend to a great extent on the rotation speed of the engine.

According to the state of the art, volumetric pumps and mechanical operation of the feed pumps or lubrication groups (LGs) are used. The feed pumps must be sized for a single type of flight and can therefore be oversized for other types of flight. In particular, given the practically constant need for oil during all the phases of the flight in some current equipment, the oil flow rate supplied is much too great for the flight phases with high rotation speed.

According to the state of the art shown in FIG. 1, one solution consists in incorporating a "by-pass" system 4. This system, positioned at the outlet 2 from the feed "function" 1, diverts part of the flow towards the intake 3 of this same function (or towards the oil tank). The oil pressure which therefore increases when passing through the pump must be relieved in the by-pass line.

Relieving the pressure energy entails the dissipation of waste energy and is unavoidable according to the state of the art.

Another solution in the state of the art is to operate the feed pumps by electric motors. However, such equipment makes the engine considerably heavier.

Document JP-A-57 070907 discloses a lubricating circuit for a vapor turbine capable of increasing the supply oil pressure so as to certainly feed oil to the turbine bearing in emergency conditions without any increase in the cost of equipment. A pipe bypassing a main oil pump is provided with an auxiliary pump device, while the pipe on a discharging side of the auxiliary pump is provided with a check valve. A discharge side and an intake side of the auxiliary pump device are connected by a test pipe, which is provided with a pressure vent valve. A starting switch is opened or closed to operate the auxiliary pump by a signal from a pressure switch which detects a drop of discharge pressure of the main oil pump. A bypass valve and a stop valve linking to a system are put in operation using an air valve which operates by a signal from a switch which detects any increase in exhaust gas pressure of the turbine.

AIMS OF THE INVENTION

The present invention aims to provide a lubrication system that allows to overcome the drawbacks of the state of the art.

In particular, the invention aims to provide a device that allows to prevent heat dissipation by the relieving of the lubrication pressure energy, and thereby to reduce the need for cooling.

The invention also aims to provide a gain in weight compared with the electrical systems for operating the pumps as in the state of the art.

The invention has the further aim of mechanical simplification and of ensuring acceptable operational security.

SUMMARY OF THE INVENTION

A first object of the present invention relates to a lubrication and/or cooling installation in an aircraft engine, comprising an oil tank, a main feed pipe feeding a main pump providing a flow in a discharge line from the main pump towards one or several systems to be lubricated and/or cooled, wherein the installation also comprises a feed pipe from an auxiliary pump fitted in parallel onto the main pipe and connected to an auxiliary feed pump, the latter providing a flow in a discharge line of the auxiliary pump connected by a three-way circuit on the one hand to a non-return valve directed towards the main discharge line, and on the other hand to a recirculation valve, said recirculation valve being controlled by the oil pressure of the main discharge line, in order to open when said oil pressure reaches a predetermined value and to divert the flow from the auxiliary feed pump into a return line directly towards the tank or towards the main feed pipe upstream from the main pump.

According to a first preferred embodiment of the invention, the recirculation valve comprises a sliding shutter co-operating with a spring calibrated so that the passage of oil from the secondary discharge line to the return line is blocked by the sliding shutter when the value of the oil pressure in the main discharge line controlling the recirculation valve at the level of a first intake is lower than said predetermined value, said slide being designed to move, once this predetermined pressure value is reached by said oil pressure, in such a way as to allow the passage of lubricant from the secondary discharge line to the return line, by the opening of the sliding shutter, between a second intake and an outlet of the valve leading towards the return line.

As an advantage, the recirculation valve is a slide valve that comprises an actual shutter of a cylindrical shape and is configured so that the second intake and the outlet are aligned and perpendicular to the side surface of the shutter.

As a further advantage, the recirculation valve comprises an actual shutter of a spherical shape and is configured so that the second intake and the outlet are upstream and downstream respectively from the shutter so as to act in the direction of the spring.

The surface of the sliding shutter is preferably designed so that, when the engine stops, the oil pressure in the main discharge line applied to the first intake on the surface of the sliding shutter drops until it closes the latter again due to the action of the spring.

According to a second preferred embodiment, the function of the head of the sliding shutter in contact with the first intake is ensured by a diaphragm.

Still according to the invention, the main and auxiliary pumps are volumetric pumps.

A second object of the present invention relates to a method for lubricating and cooling the equipment of an aircraft engine by means of the above-mentioned installation, characterised by at least the following steps:

In the start-up phase of the engine, the flow supplied by the auxiliary feed pump is fed to the equipment to be lubricated and cooled, the recirculation valve being closed and the non-return valve open;

When the engine speed increases and the flow supplied by the main pump meets the lubricant requirements, the oil pressure in the main discharge line increases and activates the recirculation valve, which opens by lowering the oil pressure at the outlet from the auxiliary pump in the secondary discharge line and by causing the non-return valve to close, the flow produced by the auxiliary pump thus being directly diverted towards the tank;

The volume of lubricant recirculated in the auxiliary pipe returns to the tank or towards the main feed pipe upstream from the main pump without a major change in pressure.

As an advantage, the method of the invention is characterised by at least the following steps:

In the start-up phase of the engine, the flow supplied by the auxiliary feed pump is fed to the equipment to be lubricated and cooled, the recirculation valve being closed and the non-return valve open;

When the increasing pressure applied to the head of the sliding shutter exceeds said predetermined value, fixed by the recoil of the spring, the slide moves in the direction of the shutter, allowing the passage of the oil located in the secondary discharge line in the return line, the pressure in the secondary discharge line dropping and thereby causing the closure of the non-return valve by the pressure difference applied to its ends;

The entire flow from the auxiliary pump is diverted towards the tank or towards the main feed pipe upstream from the main pump.

A third object of the present invention relates to the use of the above-mentioned lubrication installation for cooling aircraft engine equipment with an oil requirement that is more or less constant for all the phases of a flight.

This use may advantageously be applied in the case where said equipment is an electric starter-generator.

SHORT DESCRIPTION OF THE DRAWINGS

FIG. 1, which has already been mentioned, shows a feed pump equipped with a by-pass system for a lubrication and/or cooling system in an aircraft engine, according to the state of the art.

DETAILED DESCRIPTION OF THE INVENTION

The invention consists in providing a means for diverting part of the feed flow by avoiding that it is supplied at high pressure (required outlet pressure), which thus allows to limit the heat dissipation. This invention is particularly well suited where the flow rate to be supplied is practically constant throughout the entire flight envelope.

Figure 1:
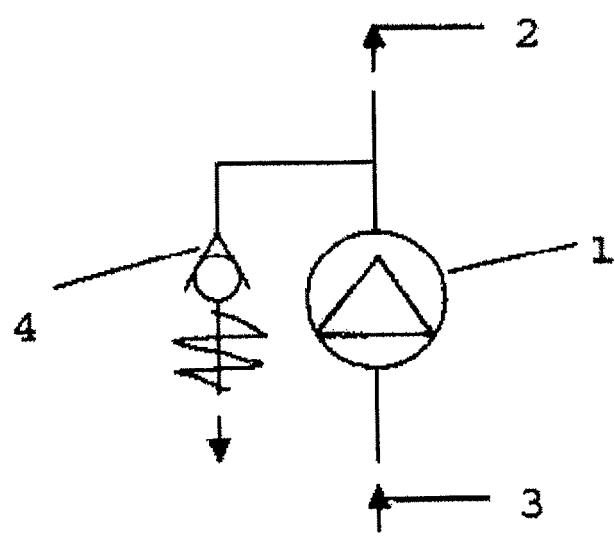
Figure 2:
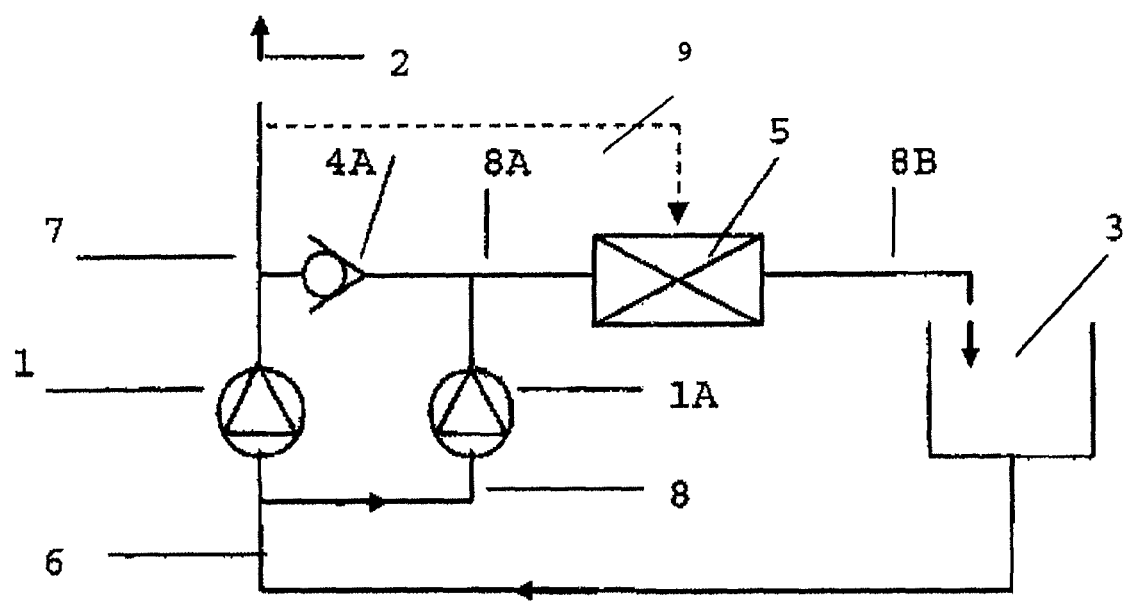
FIG. 2 is a schematic view of a general embodiment as in the invention with an auxiliary feed pump and a recirculation valve.

The invention consists in incorporating a recirculation valve 5 into an auxiliary line 8, 8A, 8B between the outlet from an additional auxiliary feed pump 1A and the tank 3, whilst connecting a non-return valve 4A to the outlet of the auxiliary feed pump 1A (see FIG. 2).

In the start-up phase of the engine, the mechanically-operated main feed pump 1 rotates at low speed. However, the required flow rate is high. It is thus necessary that the flow produced by the secondary feed pump 1A is supplied to the system 2 to be lubricated/cooled. The recirculation valve 5 must be closed during this phase and the non-return valve 4A opens as a result of the oil pressure in the auxiliary line 8A.

When the engine speed increases, the flow rate supplied by the auxiliary pump 1A is no longer needed. Indeed, the main pump 1 supplies enough to meet the needs of the system to be lubricated. So, the recirculation valve must be opened by hydraulic control 9, for example linked to the pressure in the discharge line of the main pump 7. In this case, the pressure in the auxiliary line 8A drops, which causes the non-return valve 4A to close.

In this way, the flow supplied to the system to be lubricated corresponds to the specified requirement and the volume of oil recirculated, according to a flow returned to the tank 3 (loop 6,8,8A,8B,3), is not subjected to major pressure changes. This therefore saves the energy dissipation associated with the pressure change.

It will be noted that the recirculation valve 5 is a valve that opens "wide" to lower the pressure in the auxiliary line ("fully open" system).

Description of Preferred Embodiments of the Invention

Figure 3:
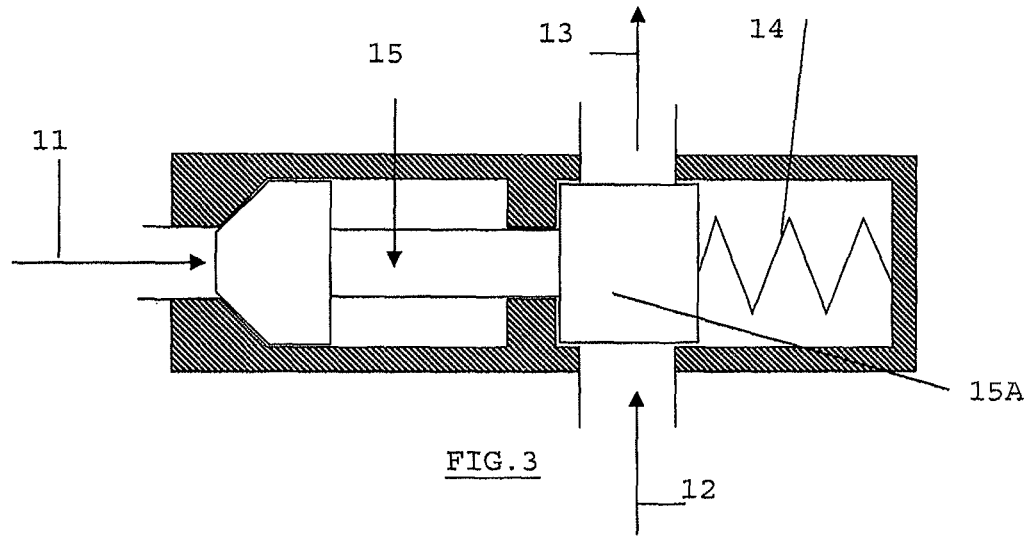
FIG. 3 shows a recirculation valve as in a preferred embodiment of the invention.

FIG. 3 is a schematic view of an example of a recirculation valve as in the present invention. The arrows 11, 12 and 13 indicate the oil pressure coming from the discharge line of the main pump 7, from the discharge line of the auxiliary pump 8A and from the return line towards the tank 8B, respectively.

When the pressure 11 in the discharge line of the main pump reaches the preset limit, in particular as a result of the resistance of the spring 14, the slide 15 moves to the right in order to open the channel 12,13. The pressure at the outlet from the auxiliary pump will thus drop and close the valve 4A of the circuit. So, the pressure 11 will also drop but the cross-sections of the slide 15 are calculated so that the balance of the spring forces and of that applied by the oil do not close the channel 12,13 again.

Figure 4:
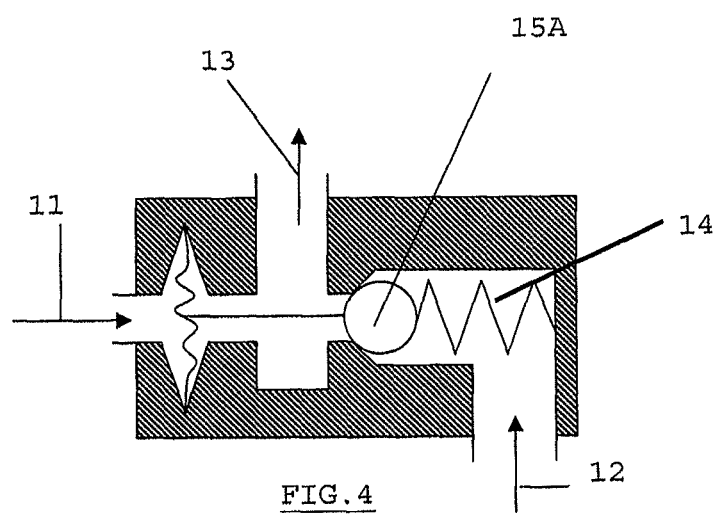
FIG. 4 shows a variant of the embodiment of FIG. 3, with a diaphragm allowing the perfect seal between both circuits and controlling the position of the shutter fitted with a spring.

According to a variant shown in FIG. 4, the force applied by the oil to a diaphragm 16 in the main pipe will increase until it reaches a limit value depending on the resistance of the spring 14 and on the pressure applied on the shutter 15A by the oil 12 coming from the auxiliary pump. Once the shutter 15A allows the passage of oil to the tank 3, the pressure in the line 12,13 will be balanced, thereby accelerating the movement of the shutter 15A, since only the force of the spring will then intervene. The spherical shape of the shutter 15A ensures the stability of the valve once it is open. The advantage of using a diaphragm is to maintain a perfect seal between the main circuit and the secondary circuit.

The valve 4A of the circuit will close and the whole flow from the auxiliary pump 1A will be diverted towards the tank.

The pressure 11 will drop as a result of the decrease in the flow rate but the spring 14 is calibrated so that the shutter 15A will not close again.

Once the engine has stopped, the shutter 15A will return to its initial position thanks to the force of the spring 14.

Advantages of the Invention

The essential advantage of the invention is to reduce the heat dissipation and thereby reduce the need for cooling.

This invention also allows a gain in weight compared with electrical systems for operating pumps that allow to regulate the rotation speed of the feed pump.

The operational security of the invention is also beneficial since the only possible cases of malfunction would entail consequences for the airplane engine upon start-up.

Lastly, the device as in the invention is made of simple and thus inexpensive mechanical elements.

The present invention, which relates to a lubrication and/or cooling circuit in an aircraft engine can be advantageously distinguished from the lubrication circuit for a vapor turbine disclosed in JP-A-57 070907 by the following elements:

The pumps in this document JP-A-57 070907 are centrifugal pumps whereas volumetric pumps are used for lubrication in aeronautics. Using centrifugal pumps requires to introduce non-return valves downstream from each of the pumps, otherwise the oil flow from one pump will be inverted in the feed pipe at the level of another pump. As a result, the lubrication function of the bearings would not be ensured anymore. Introducing non-return valves is thus required by the type of pumps used. On the contrary, both volumetric pumps according to the present invention, connected by the same control shaft, operate continuously and the passage of the oil flow from one of the pumps through the other is impossible. The invention thus only requires a single non-return valve, whose function is to prevent that the main pump directly flows towards the tank when the recirculation valve is open;

In JP-A-57 070907, the auxiliary pump allows to ensure that the bearings are fed with oil in critical cases and it has no influence on the main pump and on the remaining of the circuit. The main pump remains the same and must still be proportioned considering the most restricting operational case. This modification of the circuit thus only increases the security of the system. In the present invention, introducing an auxiliary pump allows to decrease the size of the main pump. The latter may indeed be proportioned on the nominal case whereas the auxiliary pump is proportioned in such a way as to supply the additional flow required for the most restricting case (start-up phase);

There are also differences at the level of the circuit regulation. JP-A-57 070907 discloses a relatively complex circuit with various elements for regulating the flow: non-return valves and by-pass lines. The by-pass lines are located downstream from a main pump that is over-proportioned for nominal cases and they bring back towards the tank or upstream from the main pump the high-pressure flow that needs relieving. The recirculation valve is controlled by the exhaust circuit for the turbine gases. Lastly, the auxiliary pump being only present to ensure the flow in critical cases, it does not function continuously and moreover requires to be operated. On the contrary, the lubrication circuit according to the invention was designed to simplify the system from a mechanical point of view and also as regards its regulation. Thus, it is only made up of two volumetric pumps on the same shaft that operate continuously, of a non-return valve and of a recirculation valve controlled by the oil pressure at the outlet from the main pump. This recirculation valve is hydraulically operated by the oil pressure downstream from the main pump and the non-return valve is operated by the action of the recirculation valve itself.

The invention claimed is:

1. Lubrication and/or cooling installation in an aircraft engine comprising an oil tank (3), a main feed pipe (6) feeding a main pump (1) and an auxiliary feed pump (1A), said main feed pipe (6) supplying a flow in a main discharge line (7) from the main pump (1) to one or several systems (2) to be lubricated and/or cooled, wherein the installation comprises a feed pipe (8) for the auxiliary pump (1A), said feed pipe (8) being connected at one end to the main feed pipe (6) and to at another end to the auxiliary feed pump (1A) and being fitted in parallel onto the main pipe (6), the auxiliary feed pump (1A) supplying a flow in a discharge line (8A) via a three-way circuit, the discharge line (8A) being connected on the one hand to a non-return valve (4A) directed towards the main discharge line (7), and on the other hand to a recirculation valve (5), said recirculation valve (5) being hydraulically controlled (9) by the oil pressure of the main discharge line (7) in order to open when said oil pressure reaches a predetermined value and to divert all the flow from the auxiliary feed pump (1A) into a return line (8B) directly towards the tank (3) or towards the main feed pipe (6) upstream from the main pump (1), said recirculation valve being otherwise closed so that all the flow from the auxiliary feed pump (1A) is diverted into the main discharge line (7) via the opened non-return valve (4A).

2. Installation as in claim 1, wherein the recirculation valve (5) comprises a sliding shutter (15) co-operating with a spring (14) calibrated so that the passage of the lubricant from the discharge line (8A) to the return line (8B) is blocked by the sliding shutter (15) when the value of the oil pressure in the main discharge line (7) controlling the recirculation valve (5) at the level of a first intake (11) is lower than said predetermined value, said sliding shutter (15) being designed to move once this predetermined pressure value (11) is reached by said oil pressure, in such a way as to allow the passage of the lubricant from the discharge line (8A) to the return line (8B), by the opening of the sliding shutter (15), between a second intake (12) and an outlet (13) of the valve (5) leading to the return line (8B).

3. Installation as in claim 2, wherein the recirculation valve (5) is a slide valve that comprises an actual shutter (15A) of cylindrical shape and is configured so that the second intake (12) and the outlet (13) are aligned and perpendicular to the side surface of the shutter (15A).

4. Installation as in claim 2, wherein the recirculation valve (5) comprises an actual shutter (15A) of a spherical shape and is configured so that the second intake (12) and the outlet (13) are upstream and downstream respectively from the shutter so as to act in the direction of the spring.

5. Installation as in claim 2, wherein the surface of the sliding shutter (15) is configured in such a way that, when the engine stops, the oil pressure in the main discharge line (7)

applied to the first intake (11) on the surface of the sliding shutter (15) drops until it closes the latter again due to the action of the spring (14).

6. Installation as in claim 2, wherein the function of the head of the sliding shutter (15) in contact with the first intake (11) is ensured by a diaphragm (16).

7. Installation as in claim 1, wherein the main (1) and auxiliary (1A) feed pumps are volumetric pumps.

8. Method for lubricating and cooling aircraft engine equipment by means of the installation as in claim 1, characterised by at least one of the following stages:

In the start-up phase of the engine, the flow supplied by the auxiliary feed pump (1A) is fed into a piece of equipment to be lubricated and cooled (2), the recirculation pump (5) being closed and the non-return valve (4A) open;

When the engine speed increases and the flow supplied by the main pump (1) meets the lubricant requirements, the oil pressure in the main discharge line (7) increases and activates the recirculation valve (5) which opens by causing the oil pressure to drop at the outlet from the auxiliary pump (1A) in the secondary discharge line (8A) and by causing the non-return valve (4A) to close, the flow produced by the auxiliary pump (1A) thus being diverted directly towards the tank (3);

The volume of lubricant recirculated in the auxiliary pipe (8, 8A, 8B) returns to the tank (3) or towards the main feed pipe (6) upstream from the main pump (1) without a major pressure change.

9. Method for lubricating or cooling aircraft engine equipment by means of the installation as in claim 2, characterised by at least the following stages:

In the start-up phase of the engine, the flow supplied by the auxiliary feed pump (1A) is fed to the equipment to be lubricated and cooled (2), the recirculation valve (5) being closed and the non-return valve (4A) open;

When the increasing oil pressure applied to the head of the sliding shutter (15) at its first inlet (11) exceeds said predetermined value, which is set by the resistance force of the spring (14), the slide (15) moves in the direction of the shutter (15A), allowing the passage of oil located in the secondary discharge pipe (8A) in the return line, the pressure in the secondary discharge line (8A) dropping and thereby causing the non-return valve (4A) to close by the pressure difference applied to its ends;

The entire flow from the auxiliary pump (1A) is diverted towards the tank (3) or towards the main feed pipe (6) upstream from the main pump (1).

10. Use of the installation as claim 1, for lubricating and/or cooling aircraft engine equipment with a oil requirement that is more or less constant for all the phases of the flight.

11. Use as in claim 9, wherein said equipment is an electric "starter-generator."

\* \* \* \* \*